(12) United States Patent
Payne et al.

(10) Patent No.: US 10,024,982 B2
(45) Date of Patent: Jul. 17, 2018

(54) SCINTILLATORS HAVING THE K₂PTCL₆ CRYSTAL STRUCTURE

(71) Applicants: Lawrence Livermore National Security, LLC, Livermore, CA (US); Fisk University, Nashville, TN (US)

(72) Inventors: Stephen A. Payne, Castro Valley, CA (US); Nerine Cherepy, Piedmont, CA (US); Arnold Burger, Nashville, TN (US)

(73) Assignees: LAWRENCE LIVERMORE NATIONAL SECURITY, LLC, Livermore, CA (US); FISK UNIVERSITY, Nashville, TN (US)

( * ) Notice: Subject to any disclaimer, the term of this patent is extended or adjusted under 35 U.S.C. 154(b) by 253 days.

(21) Appl. No.: 14/820,480

(22) Filed: Aug. 6, 2015

(65) Prior Publication Data

US 2017/0038483 A1 Feb. 9, 2017

(51) Int. Cl.
*G01T 1/20* (2006.01)
*G01T 1/202* (2006.01)
*C09K 11/00* (2006.01)

(52) U.S. Cl.
CPC ............ *G01T 1/2023* (2013.01); *C09K 11/00* (2013.01); *G01T 1/2018* (2013.01)

(58) Field of Classification Search
CPC .................................................... G01T 1/2023
See application file for complete search history.

(56) References Cited

U.S. PATENT DOCUMENTS 5,039,448 A   8/1991   Ackerman

OTHER PUBLICATIONS

Ackermann, J.F., "Preparation and luminescence of some K2PtCl6 materials," Material Research Bulletin, vol. 19, 1984, pp. 783-792.
Alekhin et al., "Improvement of —ray energy resolution of LaBr3:Ce3+ scintillation detectors by Sr2+ and Ca2+ co-doping," Applied Physics Letters 102, 2013, pp. 161915/1-161915/4.
Birowosuto et al., "Novel y—and X-ray scintillator research: on the emission wavelength, light yield and time response of Ce3+ doped halide scintillators," Physica Status Solidi A, vol. 206, 2009, pp. 9-20.
Brendel et al., "TG and DTA investigations on hexaiodometallates," Thermochemica Acta, vol. 83, 1985, pp. 167-172.
Cherepy et al., "Scintillators with potential to supersede lanthanum bromide," EEE Transactions in Nuclear Science, vol. 56, 2009, pp. 873-880.
Donker et al., "On the luminescence of selenium(IV) in A2ZrCl6, (A=Cs,Rb)," Chemical Physics Letters, vol. 158, No. 6, Jul. 23, 1989, pp. 509-514.
Donker at al. "On the luminescence of Te4+ in A2ZrCl6 (A=Cs,Rb) and A2SnCl6 (A=Cs,Rb,K)," Physics and chemistry of Solids, vol. 50, No. 6, 1989, pp. 603-609.

(Continued)

*Primary Examiner* — David Porta
*Assistant Examiner* — Hugh H Maupin
(74) *Attorney, Agent, or Firm* — Zilka-Kotab, P.C.

(57) ABSTRACT

According to one embodiment, a scintillator includes a host material having the chemical formula: $A_2BX_6$, where A includes a monovalent ion, B includes a tetravalent ion, and X includes a halide ion.

21 Claims, 7 Drawing Sheets

(56) References Cited

OTHER PUBLICATIONS

Dorenbos et al., "Scintillation properties of RbGd2Br7:Ce3+ crystals; fast, efficient, and high density Scintillators," Nuclear Instruments and Methods in Physics Research B, vol. 132, 1997, pp. 728-731.

Glodo et al., "Selected Properties of Cs2LiYCl6, Cs2LiLaCl6, and Cs2LiLaBr6 Scintillators," IEEE Transactions on Nuclear Science, vol. 58, No. 1, Feb. 2011, pp. 333-338.

Maniv, S., "Crystal data for Cs2HfCl6," Journal of Applied Crystal, vol. 9, 1976, pp. 245.

Selling et al., "Cerium-doped barium halide scintillators for x-ray and ?-ray detections," Journal of Applied Physics, vol. 102, 2007, pp. 074915/1-074915/7.

Shah et al., "CeBr3 Scintillators for Gamma-Ray Spectroscopy," IEEE Transactions on Nuclear Science, 2004, pp. 1-4.

Van Loef et al., "High-energy-resolution scintillator: Ce3+ activated LaBr3," Applied Physics Letters, vol. 79, No. 10, Sep. 3, 2001, pp. 1573-1575.

Van'T Spijker et al., "Scintillation properties of K2LaCl5 with Ce doping," Radiation Measurements, vol. 24, No. 4, 1995, pp. 379-381.

Kravchenko et al., "Temperature Dependence of NQR Spectra and Phase Transitions in Alkali Metal Hexaiodozirconates and Hafnates (IV)," Z. Naturforsch, vol. 41a, 1986, pp. 294-298.

Reinberg, A.R., "Sharp-Line Luminescence from Os4+ and Mo3+ in Cs2HfC16+," Physical Review B, vol. 3, No. 1, Jan. 1, 1971, pp. 41-46.

Hofstadter, R., "Alkali Halide Scintillation Counters," Physical Review, vol. 74, May 20, 1948, pp. 100-102.

Hofstadter, R., "The Detection of Gamma-Rays with Thallium-Activated Sodium Iodide Crystals," Physical Review, vol. 75, No. 5, Mar. 1, 1949, pp. 796-810.

Hofstadter et al., "Measurement of Gamma-Ray Energies with Single Crystals of NaI(T1)," Physical Review, vol. 30, No. 4, Nov. 15, 1950, pp. 631-637.

Fiorini et al., "Gamma-Ray Spectroscopy with LaBr3Ce Scintillator Readout by a Silicon Drift Detector," IEEE Transactions Nuclear Science, vol. 53, No. 4, Aug. 2006, pp. 2392-2397.

Cherepy et al., "Strontium and barium iodide high light yield scintillators," Applied Physics Letters, vol. 92, 2008, pp. 1-3.

Choong et al., "Design of a Facility for Measuring Scintillator Non-Proportionality," IEEE Transactions on Nuclear Science, vol. 55, No. 3, Jun. 2008, pp. 1753-1758.

Payne et al., "Nonproportionality of Scintillator Detectors: Theory and Experiment. II," IEEE Transactions on Nuclear Science, vol. 58, No. 6, Dec. 2011, pp. 3392-3402.

Grasser et al., "On the intrinsic nature of the blue luminescence in CaWO4," Journal of Luminescence, vol. 27, Apr. 1982, pp. 263-272.

Smolik et al., "Separation of zirconium and hafnium using Diphonix® chelating ion-exchange resin," Hydrometallurgy, vol. 95, 2009, pp. 350-353.

Guss et al., "Results for aliovalent doping of CeBr3 with Ca2+," Journal of Applied Physics 115, vol. 3, 2014, pp. 034908/1-034908/10.

Quarati et al., "Co-doping of CeBr3 scintillator detectors for energy resolution enhancement," Nuclear Instruments and Methods in Physics Research A, No. 735, Oct. 8, 2013, pp. 655-658.

Guillot-Noel et al., "Optical and scintillation properties of cerium-doped LaCl3, LuBr3 and LuCl3," Journal of Luminescence, vol. 85, 1999, pp. 21-35.

Yen et al., "Phosphor Handbook," 2nd edition, CRC Press, 2007, 1080 pages.

Knoll, G.F., Radiation Detection and Measurements, 4th edition, New York: Wiley, 2010, 853 pages.

Rodnyi, P.A., "Physical Processes in Inorganic Scintillators," CRC Press, May 30, 1997, 240 pages.

SCINTILLATORS HAVING THE $K_2PTCL_6$ CRYSTAL STRUCTURE

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to scintillator, and more particularly to scintillators having the $K_2PtCl_6$ crystal structurea, which may be particularly useful for radiation detection.

BACKGROUND

Detection and classification of gamma ray emitters has attained heightened importance in the protection of vulnerable targets and populaces from high energy explosives. Many nuclear explosives emit gamma rays, due to radioactive decay of the materials comprising the explosives. However, many less harmful and non-explosive materials also emit gamma rays. Therefore, it is desirable to be able to identify, and whenever possible, distinguish between the types of gamma ray emitters in an unknown material, possibly further concealed inside of a container or vehicle of some type, such as a car, van, cargo container, etc.

Many types of materials emit gamma rays that appear very close together on a gamma spectrograph. Scintillator detectors use crystals that emit light when gamma rays interact with the atoms in the crystals. The intensity of the light emitted can be used to determine the type of material that is emitting the gamma rays. Scintillator detectors may also be used to detect other types of radiation, such as alpha, beta, and x-rays. High energy resolution scintillator detectors are useful for resolving closely spaced gamma ray lines in order to distinguish between gamma emitters producing closely spaced gamma ray lines.

Detection sensitivity for weak gamma ray sources and rapid unambiguous isotope identification is principally dependent on energy resolution, and is also enhanced by a high effective atomic number of the detector material. Generally, gamma ray detectors are characterized by their energy resolution. Resolution can be stated in absolute or relative terms. For consistency, all resolution terms are stated in relative terms herein. A common way of expressing detector resolution is with Full Width at Half Maximum (FWHM) divided by the peak energy. This equates to the width of the gamma ray peak on a spectral graph at half of the highest point on the peak distribution.

NaI(Tl) is known in the art as an excellent scintillation counter, and to be particularly useful as a gamma ray spectrometer. The combination of the high atomic number, a density of 3.67 g/cm$^3$, a high light yield (38,000 photons/MeV), energy resolution of about 7% at 662 keV, and lack of intrinsic radioactivity make NaI(Tl) one of the most important scintillators. Moreover, another advantage associate with NaI scintillators is the ease of its production in single crystal form. However, while NaI has the rock salt (NaCl) cubic structure that yields isotropic mechanical and thermal properties, which are highly desirable during the crystal growth process, it is also quite hygroscopic.

Improved radioisotope identification detectors based on gamma spectroscopy that can rapidly detect and identify weak sources require high sensitivity detector materials offering better energy resolution, and high effective atomic number. The scintillators currently providing the highest energy resolution of as favorable as 2.6% at 662 keV and sizes larger than 1" dia.×1" height are $LaBr_3(Ce)$ and $SrI_2$ (Eu). These crystals have non-cubic structures and are hygroscopic, both of these factors reducing the growth yield of crystals, and limiting the largest available scintillator size to approximately 2" dia.×3" height. In the case of strontium iodide the purification and removal of water in the dopant, $EuI_2$ adds to processing time. $LaBr_3(Ce)$ also has intrinsic radioactivity that, for large volume detectors and low count rate applications, adds unwanted background and impedes performance for radioisotope identification of weak sources.

Another class of crystals being explored for application in gamma ray spectroscopy is the family of rare-earth elpasolites. These are quaternary compounds where most crystallize in the double perovskite structure with $Cs_2LiYCl_6$ (CLYC) and others having been reported. Their general formula is $AB_2MX_6$ where $X^-$ is a halide ion (F, Cl, Br, or I). The main attractive features of this structure are the incorporation of $^6Li$ on the A site for neutron detection and $Ce^{3+}$ activator on the B site, however the light yield of 20,000 photons/MeV for CLYC is somewhat modest among gamma ray scintillators and the presence of both Li and rare earth ions cause the crystal to be hygroscopic.

SUMMARY

According to one embodiment, a scintillator includes a host material having the chemical formula: $A_2BX_6$, where A includes a monovalent ion, B includes a tetravalent ion, and X includes a halide ion.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
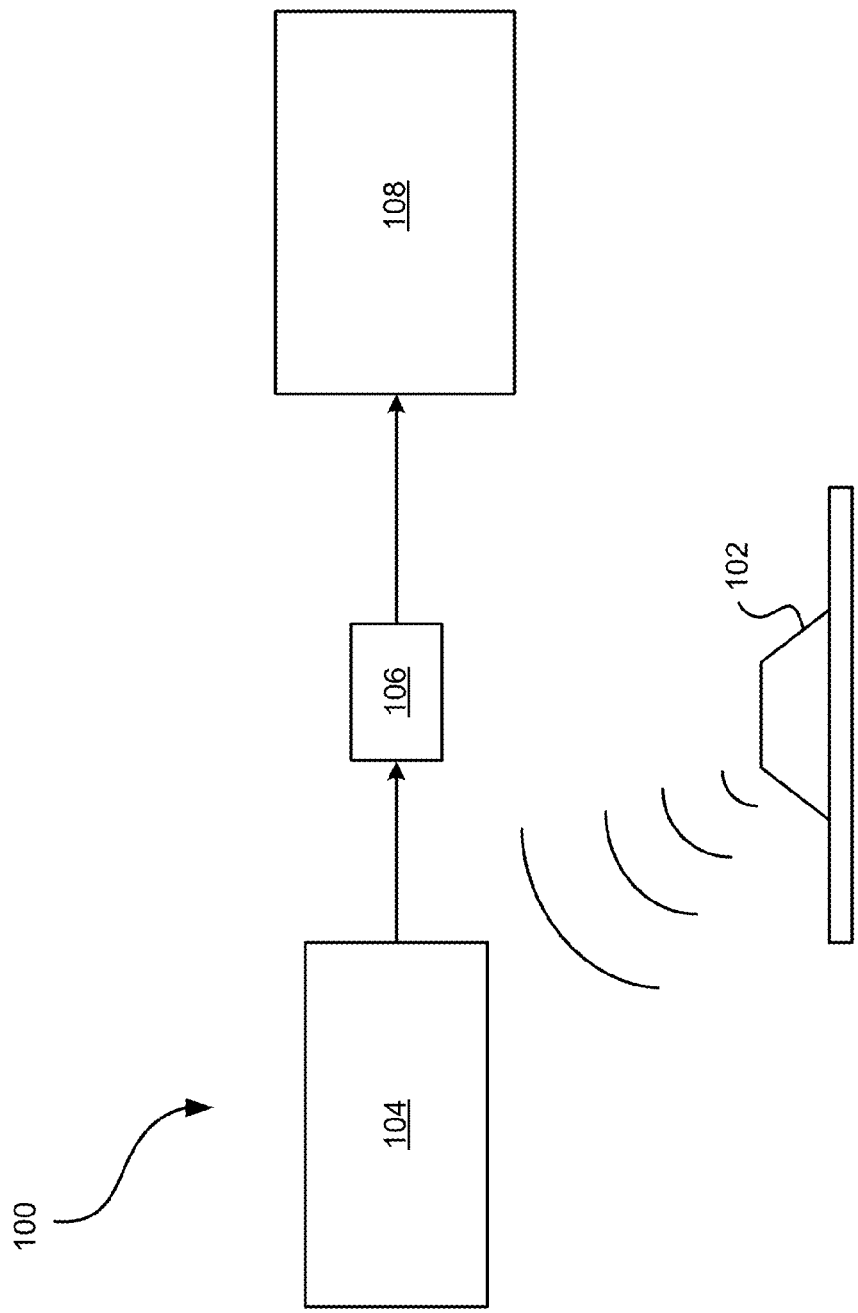
FIG. 1 shows a simplified layout of a spectroscopy system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" when combined with a value refers to plus and minus 10% of the reference value. For example, a length of about 10 nm refers to a length of 10 mm±1 mm, resolution of 4% refers to 4±0.4%, etc.

As additionally used herein, a material that is "optically transparent" refers to a material that is substantially free (e.g. >80% free, preferably >90% free) of phase segregation, such that the material is homogenous (e.g. comprises one-phase). Moreover, optically transparent materials are those through which light propagates uniformly and are capable of transmitting at least 90% of incident light.

The description herein is presented to enable any person skilled in the art to make and use the invention and is provided in the context of particular applications of the invention and their requirements. Various modifications to the disclosed embodiments will be readily apparent to those skilled in the art upon reading the present disclosure, including combining features from various embodiment to create additional and/or alternative embodiments thereof.

Moreover, the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

As discussed previously, a variety of scintillator materials have been previously explored. However, many of these known scintillator compositions suffer from undesirable crystal structures (e.g., non-cubic crystal structures) and/or are hygroscopic, therefore limiting their available scintillation size or complicating their use and deployment.

Embodiments disclosed herein describe novel, optically transparent scintillators having the general chemical formula $A_2MX_6$ and/or the generic crystal structure $K_2PtCl_6$. These novel, optically transparent scintillators exhibit low hygroscopicity, no intrinsic radioactivity, and high, proportional light yield, even without an additional activator ion, a cation dopant and/or an anion dopant included therein.

Following are several examples of general and specific embodiments of these novel, optically transparent scintillators having the $K_2PtCl_6$ crystal structure, and/or related systems and methods.

For instance, in one general embodiment, a scintillator includes a host material having the chemical formula: $A_2BX_6$, where A includes a monovalent ion, B includes a tetravalent ion, and X includes a halide ion.

Scintillator-Based Radiation Detector System

Referring now to FIG. 1, a simplified schematic of a spectroscopy system 100 is shown according to one embodiment. As an option, the spectroscopy system 100 may be implemented in conjunction with features from any other embodiment listed herein, such as those described with reference to the other FIGS. Of course, the spectroscopy system 100 and others described herein may be used in various applications and/or in permutations which may or may not be specifically described in the illustrative embodiments listed herein. For instance, the spectroscopy system 100 may include more or less components than those shown in FIG. 1, in various approaches.

As shown in FIG. 1, the spectroscopy system 100 comprises a scintillator material 102, such as of a type described herein, and which is referred to herein interchangeably as a scintillator. The system 100 also includes a photodetector 104, such as a photomultiplier tube, a silicon photomultiplier, photodiode, or other device/transducer known in the art, which can detect and register the magnitude of the light emitted from the scintillator 102. The spectroscopy system 100 is preferably configured to register x-rays, gamma rays, and/or neutrons, as well as being able to partially or completely distinguishing between said forms of radiation.

The scintillator 102 produces light pulses upon occurrence of an event, such as a neutron, a gamma ray, an x-ray, or other radiation engaging the scintillator 102. For instance, as a gamma ray traverses the scintillator 102, photons are released, appearing as light pulses emitted from the scintillator 102. The light pulses are detected by the photodetector 104 and transduced into electrical signals that correspond to the magnitude of the pulses. The type of radiation can then be determined by analyzing the integral of the light pulses and thereby identifying the gamma ray energy absorbed by the scintillator.

In some embodiments, the system 100 may be, further comprise, or be coupleable/coupled to, a preamplifier and/or digitizer (not shown in FIG. 1).

In other embodiments, the system 100 may include a processing device 106 configured to process pulse traces output by the photodetector 104, which correspond to light pulses from the scintillator 102. In some approaches, the processing device 106 may be further configured to generate radiological image data based on the pulse traces output by the photodetector 104.

In additional approaches, system 100 may include a processing device that receives data from a photodetector that is not permanently coupled to the processing device. Illustrative processing devices include microprocessors, field programmable gate arrays (FPGAs), application specific integrated circuits (ASICs), computers, etc.

The result of the processing may be output and/or stored. For example, the result may be displayed on a display device 108 in any form, such as in a histogram of the number of counts received against the total light from the scintillator or derivative thereof.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

Portions of the invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc.

Scintillator Materials

In various approaches, a scintillator comprises the composition $A_2BX_6$, where A is a suitable monovalent ion, B is a suitable tetravalent ion, and X is a suitable halide ion. In preferred approaches, A may be selected from the group consisting of: Li, Na, K, Rb, and Cs; B may be selected from the group consisting of: Ti, Zr, Hf, Sn, Se, and Te; and X may be selected from the group consisting of: Cl, Br, and I. The constituents (A, B, and X) of the scintillator may be present in any proportion provided the overall stoichiometry of the $A_2BX_6$ chemical formula is retained. In particular approaches, the scintillator crystal may have any of the following chemical formulas: $Cs_2HfCl_6$, $Na_2HfCl_6$, $Li_2HfCl_6$, $Cs_2HfBr_6$, $Na_2HfBr_6$, $Li_2HfBr_6$, $Cs_2HfI_6$, $Na_2HfI_6$, $Li_2HfI_6$, $Cs_2ZrCl_6$, $Na_2ZrCl_6$, $Li_2ZrCl_6$, $Cs_2ZrBr_6$, $Na_2ZrBr_6$, $Li_2ZrBr_6$, $Cs_2ZrCl_6$, $Na_2HfCl_6$, $Li_2HfI_6$, $Cs_2ZrCl_6$, $Na_2ZrCl_6$, $Li_2ZrCl_6$, $Cs_2ZrBr_6$, $Na_2ZrBr_6$, $Li_2ZrBr_6$, $Cs_2ZrI_6$, $Na_2ZrI_6$, $Li_2ZrI_6$, $Cs_2TiCl_6$, $Na_2TiCl_6$, $Li_2TiCl_6$, $Cs_2TiBr_6$, $Na_2TiBr_6$, $Li_2TiBr_6$, $Cs_2TiI_6$, $Na_2TiI_6$, or $Li_2TiI_6$.

In more approaches, the scintillator may be comprised of mixtures of one or more crystal compositions, where each crystal independently has any of the aforementioned chemical structures. For instance, in one approach, the scintillator may be a single crystal having the chemical formula $A_2BX_6$. In another approach, the scintillator may include at least a first and second composition, where the first and second crystals both have the chemical formula $A_2BX_6$ provided that one or more of the constituents (e.g., A, B, and/or X) of the first crystal are different than those of the second crystal.

In some approaches, the scintillator may comprise one or more activator ions configured to capture energy imparted to the scintillator and emit light in the ultraviolet, visible or infrared region. In general, the emission generated by an activator is characteristic of the electronic structure of said activator. In various approaches, the one or more activator ions may be particularly configured to modify the output scintillation light compared to that of the pure scintillator (i.e., a scintillator without any activator ions but is otherwise identical) by one or more of the following: changing the emission wavelength or decay time, increasing or decreasing the amount of light emitted, and improving the spectral resolution of the scintillator as a gamma or x-ray detector. Suitable activator ions may include, but are not limited to, $Tl^+$, $Cu^+$, $Ag^+$, $Au^+$, $Pb^{2+}$, $Bi^{3+}$, $In^+$, $Sn^{2+}$, $Sb^{3+}$, $Ce^{3+}$, $Pr^{3+}$, $Eu^{2+}$, $Yb^{2+}$, $Nb^{5+}$, $Ta^{5+}$, $W^{6+}$, and combinations thereof. In preferred approaches, the total amount of the one or more activators included in the scintillator may be about 10 at. % or less.

In more approaches, the scintillator may comprise one or more additional cation dopants configured to enhance the performance of the scintillator by capturing the energy that is otherwise migrating through the host medium. Suitable examples of cation dopant include, but are not limited to: monovalent cations such as Li, Na, K, Rb, Cs, etc.; trivalent cations such as La, Gd, Lu, Al, Ga, In, etc.; and tetravalent cations such as Si, Ge, Sn, Ti, Zr, Hf, etc. As used herein, these additional cation dopants refer to materials not already present in the host material/medium of the scintillator. For example, in an approach where the host medium of the scintillator has the chemical formula $Cs_2HfCl_6$, one or more of the cations Li, Na, K, Rb, La, Gd, Lu, Al, Ga, In, Si, Ge, Sn, Ti, Zr may be included as additional dopants as they are not already present in said host material/medium. In preferred approaches, each cation dopant included in the scintillator may be present at a level of about 20 at. % or less relative to the host ion for which it is substituting, and is most preferably doped at about 2 at. %. In yet more approaches, the performance of the scintillator may be further improved by codoping the scintillator with two of the aforementioned additional cation dopants.

In further approaches, the scintillator may include one or more additional anion dopants configured to enhance the performance of the scintillator by capturing the energy that is otherwise migrating through the host material/medium. Suitable examples of anion dopants include, but are not limited to, $F^-$, $Cl^-$, $Br^-$, $I^-$, $O^{2-}$, $S^{2-}$, $Se^{2-}$, and $Te^{2-}$. Again as used herein, these additional anion dopants refer to materials not already present in the host material/medium of the scintillator. For example, in an approach where the host material/medium of the scintillator has the chemical formula $Cs_2HfCl_6$, one or more of the anions $F^-$, $Br^-$, $I^-$, $O^{2-}$, $S^{2-}$, $Se^{2-}$, and $Te^{2-}$ may be included as additional dopants as they are not already present in said host material/medium. In preferred approaches, each anion dopant included in the scintillator may be present at a level of about 20 at. % or less relative to the host ion for which it is substituting, and is most preferably doped at about 2 at. %.

In other approaches, the scintillator may include a component particularly configured to detect thermal neutrons. In some approaches, this component may have a low effective atomic number. For instance, in one approach, the scintillator may include $^6Li$ as an additional component/thermal neutron capture agent.

It is important to note that the scintillator may include any combination of the activator ions, the additional cation dopants, the additional anion dopants, and the components particularly configured for thermal neutron capture. For instance, the scintillator may include none, one, two, three, or all of the following optional materials: activator ions, additional cation dopants, additional anion dopants, and components particularly configured for thermal neutron capture.

In additional approaches, the scintillator may be comprised of one or more optically transparent crystals, where at least one of the crystals has cubic symmetry with no or minimal structural deviations therefrom. In a particular approach, the scintillator may be comprised of one or more crystals where at least one of the crystals has the $K_2PtCl_6$ crystalline structure.

In more approaches, the scintillator may be comprised of one or more optically transparent crystals, where the length of at least one dimension of scintillator is in a range from about 1 mm to about 12 inches.

In further approaches, the scintillator may be sintered from powders, never melted, and grown as an optically transparent polycrystalline monolith/body, where the length of at least one dimension of scintillator is in a range from about 1 mm to about 12 inches.

In yet other approaches, the scintillator may be in the form of an optically transparent or translucent pressed powder, which may be particularly useful for radiography applications.

In preferred approaches, the scintillator has an emission peak centered around 400 nm. In yet more preferred approaches, the scintillator exhibits a decay time of about 10 µs or less, more preferably about 4 µs or less. In further preferred approaches, the scintillator has a resolution of about 4% or less at 662 keV, more preferably a resolution of about 3% or less at 662 keV.

Exemplary Methods of Making the Scintillator Material

Figure 2:
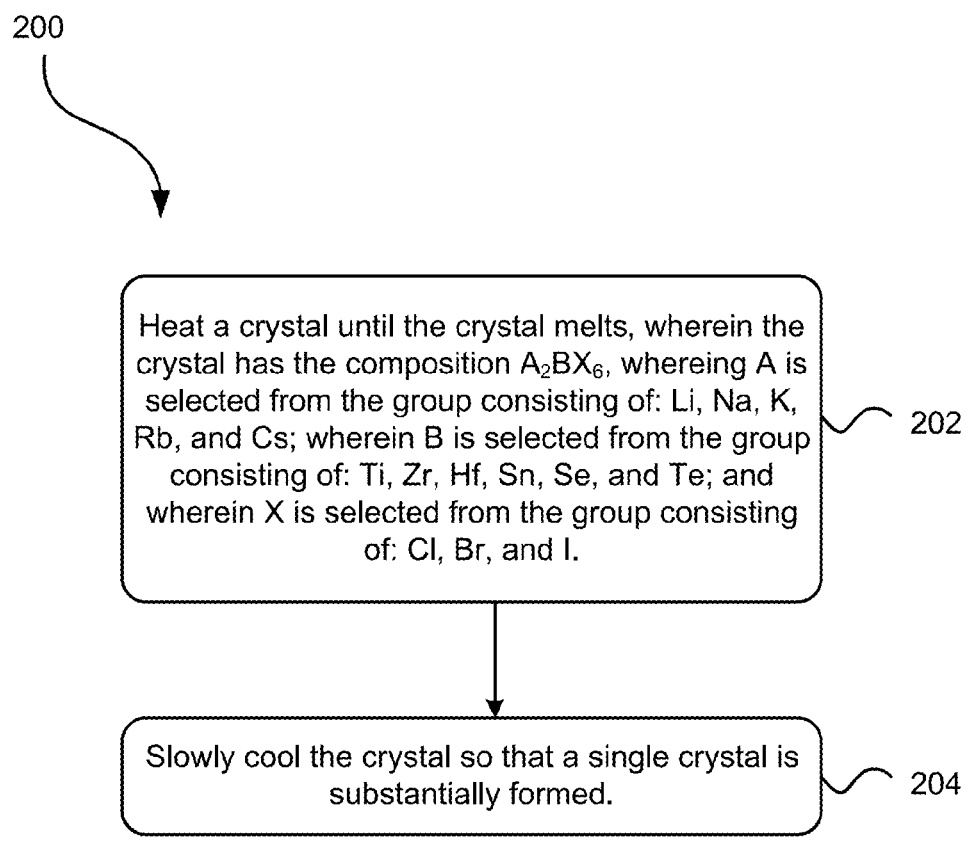
FIG. 2 is a flowchart of a method for making a scintillator material, according to one embodiment.

In some approaches, the scintillators described herein may be formed from melt growth techniques (e.g., via Bridgman or Czochralski methods). FIG. 2 provides one exemplary method 200 of making a single crystal scintillator via a melt growth technique, according to one embodiment. The method 200, and other presented herein, may be carried out in any desired environment. Moreover, more or less operations than those shown in FIG. 2 may be included in the method 200, according to various embodiments. It should also be noted that any of the aforementioned features of the scintillators described herein may be used in any of the embodiments described in accordance with the various methods.

As shown in FIG. 2, the method 200 includes heating a crystal, typically at temperatures ranging from about 400 Celsius to about 1400 Celsius, until the crystal melts. See operation 202. In some approaches, the crystal comprises the composition $A_2BX_6$, where A may be selected from the group consisting of: Li, Na, K, Rb, and Cs; B may be selected from the group consisting of: Ti, Zr, Hf, Sn, Se, and Te; and X may be selected from the group consisting of: Cl, Br, and I.

In an optional approach, one or more activator ions (e.g., $Tr^+$, $Cu^+$, $Ag^+$, $Au^+$, $Pb^{2+}$, $Bi^{3+}$, $In^+$, $Sn^{2+}$, $Sb^{3+}$, $Ce^{3+}$, $Pr^{3+}$, $Eu^{2+}$, $Yb^{2+}$, $Nb^{5+}$, $Ta^{5+}$, $W^{6+}$, and combinations thereof) may be incorporated in the crystal, usually prior to the melting process. In another optional approach, one or more additional cation dopants (e.g., Li, Na, K, Rb, Cs, La, Gd, Lu, Al, Ga, In, Si, Ge, Sn, Ti, Zr, Hf, and combinations thereof) may be incorporated in the crystal prior to and/or during the melting process. In yet another optional approach, one or more additional anion dopants (e.g., $F^-$, $Cl^-$, $Br^-$, $L^-$, $O^{2-}$, $S^{2-}$, $Se^{2-}$, $Te^{2-}$, and combinations thereof) may be incorporated in the crystal prior to and/or during the melting process. In yet a further optional approach, one or more thermal neutron capture agents (e.g., $^6Li$) may be incorporated in the crystal prior to and/or during the melting process.

As also shown in FIG. 2, after the crystal has been melted, the crystal is slowly cooled so that a single crystal is substantially formed. See operation 204.

Figure 3:
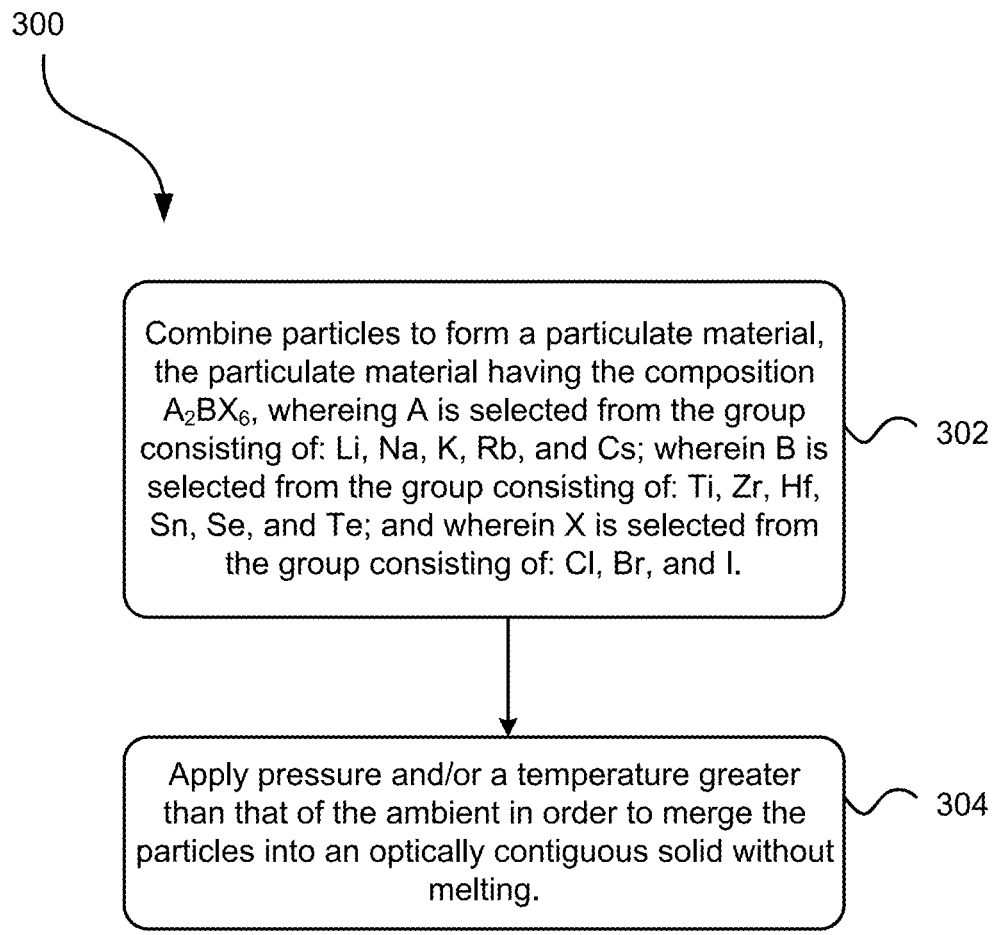
FIG. 3 is a flowchart of a method for making a scintillator material, according to another embodiment.

The scintillators described herein may also be formed via techniques that do not involving a melting process. For instance, FIG. 3 provides one exemplary method 300 of making a single crystal scintillator via a sintering-type process, according to one embodiment. The method 300, and other presented herein, may be carried out in any desired environment. Moreover, more or less operations than those shown in FIG. 2 may be included in the method 300, according to various embodiments. It should also be noted that any of the aforementioned features of the scintillators described herein may be used in any of the embodiments described in accordance with the various methods.

As shown in FIG. 3, the method 300 includes combining particles to form a particulate material. See operation 302. In preferred approaches, each of the particles in the particulate material has a size in a range from about 10 nm to about 10 mm. In yet more preferred approaches, the particulate material has the composition $A_2BX_6$, where A may be selected from the group consisting of: Li, Na, K, Rb, and Cs; B may be selected from the group consisting of: Ti, Zr, Hf, Sn, Se, and Te; and X may be selected from the group consisting of: Cl, Br, and I.

In various approaches, the particulate material may optionally include any of the following additional materials: one or more activator ions (e.g., $Tr^+$, $Cu^+$, $A^+$, $Au^+$, $Pb^{2+}$, $Bi^{3+}$, $In^+$, $Sn^{2+}$, $Sb^{3+}$, $Ce^{3+}$, $Pr^{3+}$, $Eu^{2+}$, $Yb^{2+}$, $Nb^{5+}$, $Ta^{5+}$, $W^{6+}$, and combinations thereof); one or more additional cation dopants (e.g., Li, Na, K, Rb, Cs, La, Gd, Lu, Al, Ga, In, Si, Ge, Sn, Ti, Zr, Hf, and combinations thereof); one of more additional anion dopants (e.g., $F^-$, $Cl^-$, $Br^-$, $I^-$, $O^{2-}$, $S^{2-}$, $Se^{2-}$, $Te^{2-}$, and combinations thereof); and/or one or more thermal neutron capture agents (e.g., $^6Li$).

As also shown in FIG. 3, the method 300 includes applying pressure of several atmospheres of more and/or a temperature greater than that of the ambient of more than about 150 Celsius in order to merge the particles into an optically contiguous solid without melting. See operation 304.

Experimental Results and Comparative Examples

Several illustrative experimental results and comparative examples associated with the scintillators described herein are provided elbow, as well as methods of making the same. It is important to note that these experimental results and comparative examples are in no way limiting, and are provided for illustration purposes only.

A new high atomic number (effective (or average) Z=58), moderate density (3.86 g/cm³) $Cs_2HfCl_6$ scintillator for gamma spectroscopy was prepared, where said scintillator has a cubic crystal structure, low hygroscopicity, no intrinsic radioactivity and high, proportional light yield, even without doping with any intentional activator. The crystal structure of $Cs_2HfCl_6$ was determined from X-ray Powder diffraction data to be cubic with a lattice parameter $a_0$=10.42±0.01 Å in the space group Fm-3m (#225) isostructural to potassium platinum chloride, $K_2PtCl_6$. The structure of $Cs_2HfCl_6$ is anti-fluorite being analogous to that of calcium fluoride ($CaF_2$) with cesium ions in the fluorine ion position and $[HfCl_6]^{-2}$ octahedra replacing the calcium ions. The $K_2PtCl_6$ crystal structure with the general formula $A_2BX_6$ is versatile in that the constituents many be a great variety of different ions, for example where A may be any of: Li, Na, K, Rb, Cs; B may be any of: Ti, Zr, Hf, Sn, Se, Te; and $X^-$ may be any of Cl, Br, I.

$Cs_2HfCl_6$ was grown via a melt growth technique. The starting materials used all exhibited good purity. Stoichiometric ratios were prepared in order to obtain the required composition of $Cs_2HfCl_6$ using 99.998% pure CsCl beads (typically 1 mm or −10 mesh), and 99.9% (trace metals basis, exclusive of Zr) $HfCl_4$ powder. Although the starting materials were not highly hygroscopic, they were slightly moisture sensitive prior to being combined and grown into a crystal, and therefore were handled and loaded in an argon environment glovebox with moisture and oxygen levels controlled to stay below 1 ppm. $Cs_2HfCl_6$ melted congruently at 820° C., which made it suitable for crystal growth using the Bridgman technique. The source material charge was melted and translated from a hot zone down to the cold zone at a typical pulling rate of 0.5-1 cm/day, and a temperature gradient of 5° C./cm was established at the solid/liquid interface. Suitable crystals were cut from the as-grown boule and polished into volumetric test crystals, 40-100 mm$^3$, for the studies presented below. The density of Cs$_2$HfCl$_6$ was determined to be 3.86 g/cm$^3$, via the Archimedes method.

Figure 4:
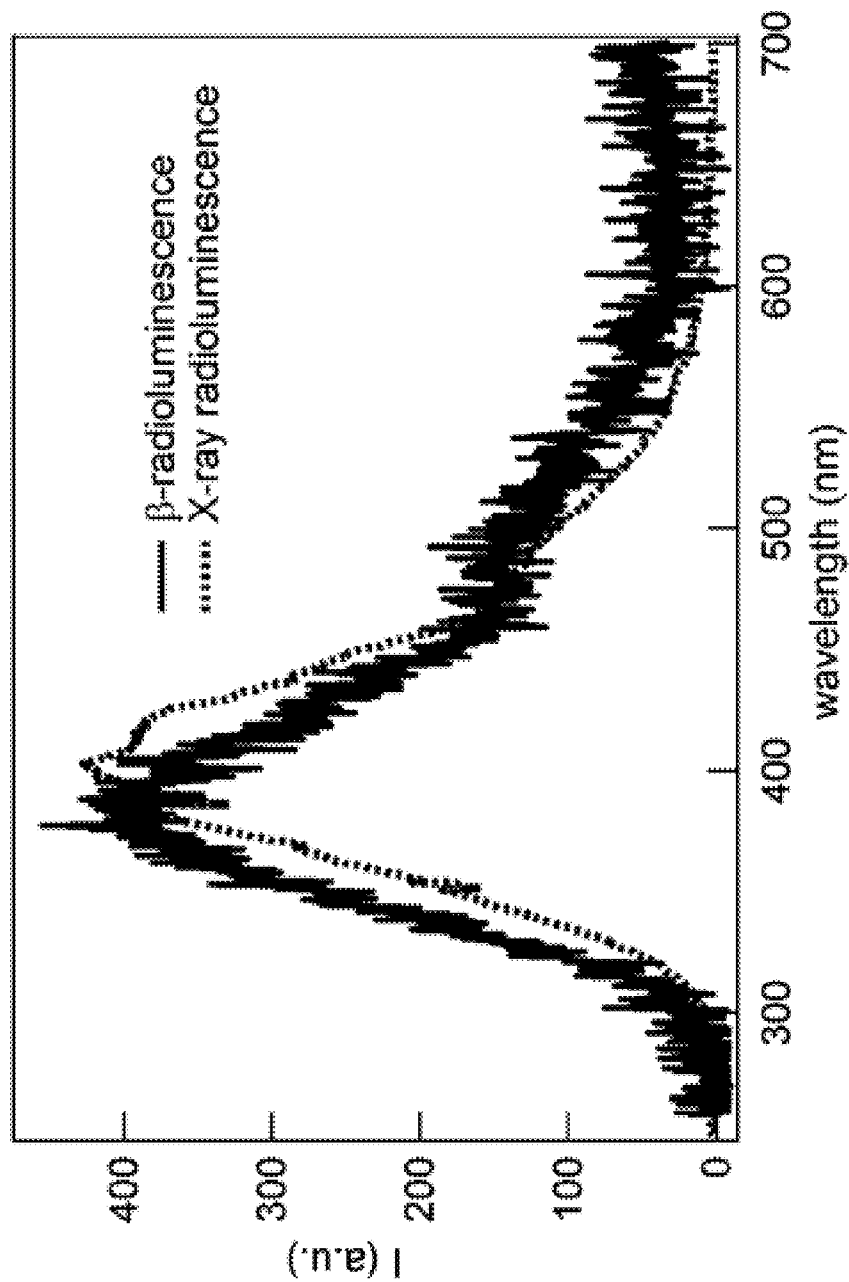
FIG. 4 illustrates radioluminescence spectra acquired with a Sr-90 beta source for an undoped $Cs_2HfCl_6$ scintillator.
Figure 5:
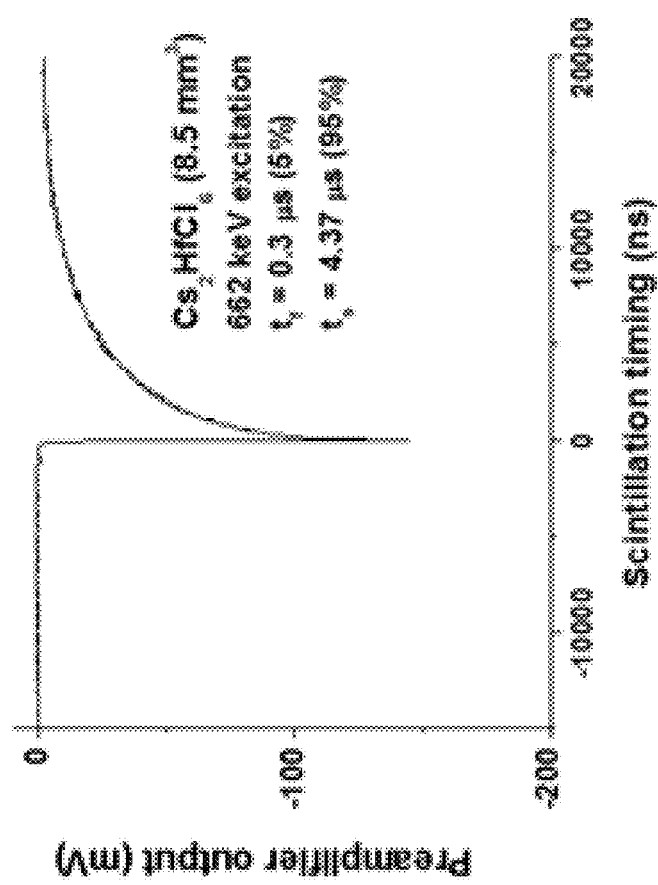
FIG. 5 illustrates the digital oscilloscope traces for timing measurements of an undoped $Cs_2HfCl_6$ scintillator's response to 662 keV gammas.

Beta-excited radioluminescence spectra were acquired using a $^{90}$Sr/$^{90}$Y source (with ~1 MeV average beta energy). The spectra collected with a spectrograph coupled to a thermoelectrically cooled silicon CCD camera are shown in FIG. 4. For X-ray radioluminescence, an x-ray tube source providing <30 keV x-rays was employed, and emission was collected by a fiber-optic-coupled spectrometer, employing a silicon CCD readout. The Cs$_2$HfCl$_6$ radioluminescence acquired with a Sr-90 beta source is in good agreement with x-ray excited radioluminescence acquired with <30 keV x-rays via a Silicon CCD readout. The light yield (LY) is estimated to be 54,000 Ph/MeV by comparison to a standard BGO crystal (Bi$_4$Ge$_3$O$_{12}$). The slight shift between spectra is likely due to differences in spectral sensitivity between the two spectrometers used for the measurements FIG. 5 shows the scintillation decay for an 8.5 mm$^3$ Cs$_2$HfCl$_6$ crystal. The scintillation timing was tested using 662 keV excitation (Cs-137), a photomultiplier tube, a preamplifier, and a digital oscilloscope. The scintillation timing response consists of two components. The fast decay time is 0.3 µs as and carries just 5% of integrated intensity, while the slower component of 4.37 µs as accounts for the reminder 95% of the scintillation pulse. Gamma ray spectra were acquired at an ambient temperature 220° C. using a bialkali photomultiplier tube under a bias of 900 V, and a preamplifier. The best scintillation performance was obtained with a 40 mm$^3$ sample producing an energy resolution of 3.37% at 662 keV using a $^{137}$Cs source. An estimated light yield (LY) was calculated by comparing the pulse height for 662 keV gamma excitation of Cs$_2$HfCl$_6$ with that of NaI(Tl) under similar testing conditions. From this measurement, the estimated LY of undoped Cs$_2$HfCl$_6$ is 33,000 photons/MeV.

Figure 6:
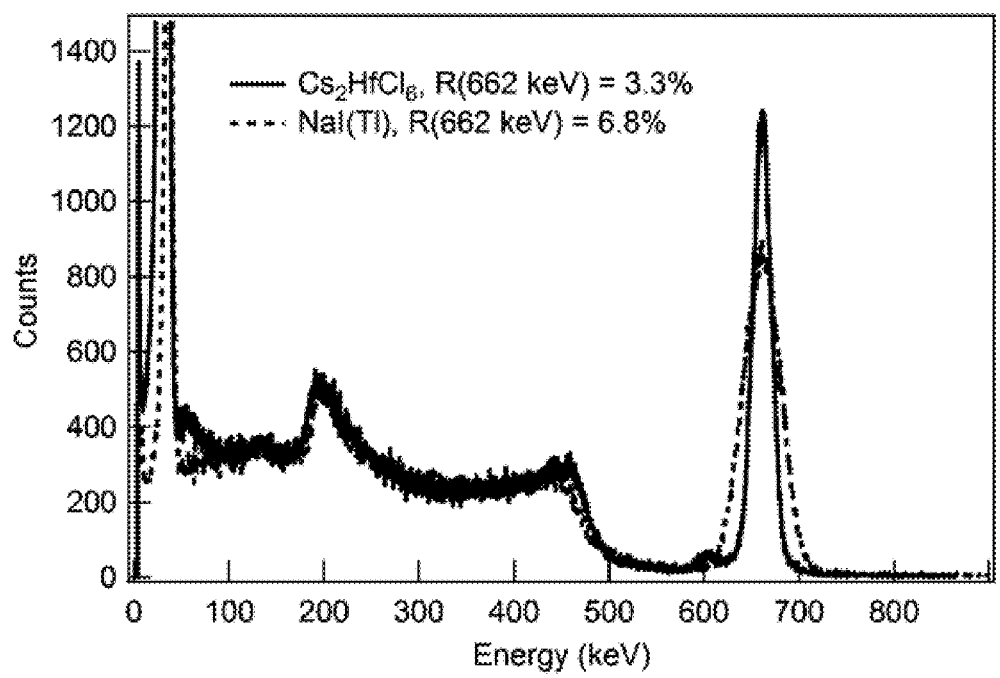
FIG. 6 illustrates pulse height spectra acquired with a Cs-137 source for a $Cs_2HfCl_6$ scintillator (0.65 cm$^3$ in size) and a standard NaI(Tl) crystal (1"×1" in size), both measured with 12 µs shaping time.

A third Cs$_2$HfCl$_6$ sample having a volume of 0.65 cm$^3$ was measured, and an energy resolution at 662 keV of 3.3% was obtained. Samples were optically coupled to a photomultiplier tube, which was connected to a preamplifier, and the signals were shaped with spectroscopy amplifier (shaping time of 12 µs) and then recorded with a multi-channel analyzer. Spectra were analyzed off-line by non-linear least squares fitting to a Gaussian in order to estimate the energy resolution. This spectrum is shown in FIG. 6 along with the data from a NaI(Tl) crystal. The gamma light yield of Cs2HfCl6, compared to NaI(Tl) is estimated to be 33,000 Photons/MeV. The small peak in the Cs$_2$HfCl$_6$ spectrum at 607 keV is likely due to the escape of Kα fluorescence x-ray, typical of small volume detectors.

Figure 7:
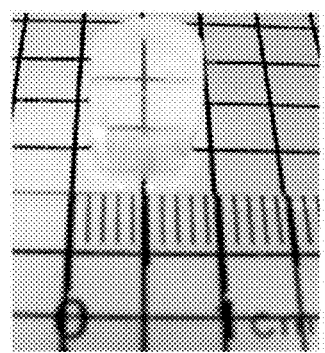
FIG. 7 is a photograph of an undoped, optically transparent $Cs_2HfCl_6$ scintillator on a paper background (0.5 cm squares), under 254 nm excitation.

FIG. 7 is a photograph of the undoped, optically transparent Cs$_2$HfCl$_6$ crystal on a paper background (0.5 cm squares), under 254 nm excitation. While not shown in the black and white photograph of FIG. 7, the Cs$_2$HfCl$_6$ crystal exhibits its characteristic blue emission.

Figure 8:
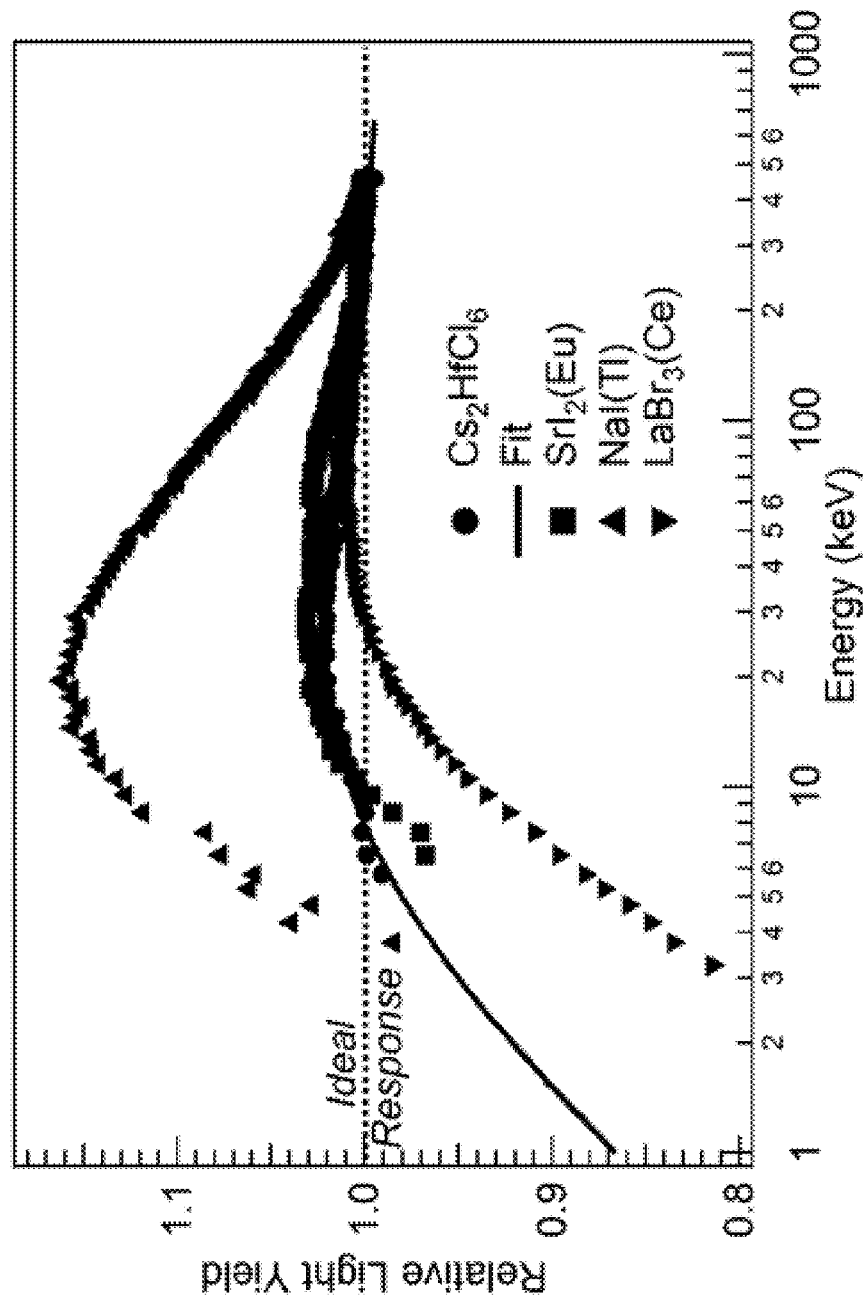
FIG. 8 illustrates experimental electron light yield nonproportionality curves for $Cs_2HfCl_6$, $SrI_2(Eu)$, NaI(Tl), and $LaBr_3(Ce)$.

One of the surprising and unexpected observations encountered in developing and analyzing the undoped Cs$_2$HfCl$_6$ scintillator, was that its so-called "electron non-proportionality" is exceeding favorable. The electron non-proportionality data for Cs$_2$HfCl$_6$ scintillator and a representative sample of a few well-known scintillators (e.g., NaI(Tl), LaBr$_3$(Ce) and SrI$_2$(Eu)) appear in FIG. 8. For the theoretically "ideal" scintillator, the curves in FIG. 8 would be an exact horizontal line, (where the ordinate is the ratio of the UV-visible photons generated divided by the energy of the exciting electron in relative light yield units of photons/keV). All scintillators deviate from the ideal case; however, the greater the deviation from the horizontal ideal, the worse the possible energy resolution will be. The modeled contribution from non-proportionality for NaI(Tl), LaBr$_3$(Ce) and SrI$_2$(Eu) were 5.04%, 2.43%, and 2.20% (with an estimated error of 0.3%); whereas the undoped Cs$_2$HfCl$_6$ scintillator is assessed as having a non-proportionality-limited resolution of 1.37% based on the same analysis. What is particularly surprising and unexpected with regard to the Cs$_2$HfCl$_6$ scintillator is that is exhibits the flattest curve relative to the other scintillators presented in FIG. 8, as well as to other known scintillators previously student yet omitted from FIG. 8 for brevity. From the non-proportionality data, the Cs$_2$HfCl$_6$ scintillator, even undoped, is therefore predicted to have excellent energy, a prediction supported by experimental data obtained thus far (see e.g., FIG. 6).

From the above experimental results, a new class of scintillators, based on cubic crystals with the K$_2$PtCl$_6$ antifluorite structure have been developed. It has surprisingly and unexpectedly been found that Cs$_2$HfCl$_6$ scintillator, with no dopant included therein, nonetheless has a resolution of 3.3% at 662 keV. The light yield (from the photomultiplier tube readout) is currently on the order of 30,000 photons/MeV near 400 nm. Without wishing to be bound by a particular theory, it is speculated that the broad emission band of undoped Cs$_2$HfCl$_6$ that is centered at about 400 nm may be caused by an intrinsic luminescent center based on transitions of charge transfer type of the undisturbed [HfCl$_6$]$^{2-}$ anion complex, placed in the cubic environment created by Cs$^+$ ions at the corners of the cube. As discussed herein, the inclusion of activator ions and/or cation dopants and/or anion dopants in the Cs$_2$HfCl$_6$ scintillator may further increase the light yield, shorten the emission decay time, shift the wavelength of the emission spectrum, and improve the energy resolution thereof.

Applications and Uses

Embodiments of the present invention may be used in a wide variety of applications, and potentially any application in which high light yield and/or discrimination between gamma rays, fast and thermal neutrons, charged particles, etc. is useful.

Illustrative uses of various embodiments of the present invention include, but are not limited to, applications requiring radiation detection. Detection, surveillance and monitoring of radioactive materials, including identification of special nuclear materials (SNM), are a few such examples. Various embodiments can also be used in the nuclear fuel cycle, homeland security applications, nuclear non-proliferation, medical imaging, special nuclear material, high energy physics facilities, etc. Moreover, the ability to distinguish neutrons from gammas down to the few hundred keV/gamma equivalent regime will be very useful for non-proliferation, homeland security and safeguards applications.

Yet other uses include detectors for use in treaty inspections that can monitor the location of nuclear missile warheads in a nonintrusive manner. Further uses include implementation in detectors on buoys for customs agents at U.S. maritime ports, cargo interrogation systems, and instruments that emergency response personnel can use to detect or search for a clandestine nuclear device. Assessment of radiological dispersal devices is another application.

For applications pertaining to radiation detection, such as those discussed directly above, any of the scintillators described herein may be employed in a radiation detector. In particular approaches, this radiation detector may include a means of reading-out the scintillation light response of the scintillator and registers the magnitude of the light yield by employing a photomultiplier tube, silicon photomultiplier, photodiode, or any transducer configured to respond to the scintillation light. This radiation detector may ultimately produce a pulse height spectrum, where the light response is presented as a histogram of the number of counts collected within each bin of light yield generated by the scintillator. Moreover, in preferred approaches, such a radiation detector is configured to register x-rays, gamma rays, and/or neutrons, and is also configured to partially or completely distinguish between these particular forms of radiation.

Further application of the scintillators described herein may include radiography, dosimetry, and scientific research. For example, in another approach, any of the scintillators described herein may be employed in a radiography system, where the scintillator servers as a means of reading-out the light response to register an image with a pixelated photodetector array by registering the light level at different points with the plane. In such approaches, the scintillator may preferably be deployed in the form of a powder near the photodetector array so as to substantially direct the scintillation light in the photodetector array.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A scintillator, comprising:
a host material having the chemical formula: $A_2BX_6$, wherein A includes a monovalent ion, B includes a tetravalent ion, and X includes a halide ion,
wherein the scintillator exhibits an optical response for at least one of: thermal neutrons, fast neutrons and gamma rays.

2. The scintillator as recited in claim 1, wherein A is selected from the group consisting of: Li, Na, K, Rb, and Cs.

3. The scintillator as recited in claim 1, wherein B is selected from the group consisting of: Ti, Zr, Hf, Sn, Se, and Te.

4. The scintillator as recited in claim 1, wherein X is selected from the group consisting of: Cl, Br, and I.

5. The scintillator as recited in claim 1, wherein the scintillator has an energy resolution at 662 keV of about 4% or less.

6. The scintillator as recited in claim 1, wherein the host material further comprises at least one activator ion selected from the group consisting of: $Tl^+$, $Cu^+$, $Ag^+$, $Au^+$, $Pb^{2+}$, $Bi^{3+}$, $In^+$, $Sn^{2+}$, $Sb^{3+}$, $Ce^{3+}$, $Pr^{3+}$, $Eu^{2+}$, $Yb^{2+}$, $Nb^{5+}$, $Ta^{5+}$, $W^{6+}$, and combinations thereof.

7. The scintillator as recited in claim 1, wherein the host material further comprises at least one additional cation dopant selected from the group consisting of: Li, Na, K, Rb, Cs, Mg, Zn, Ca, Sr, Ba; La, Gd, Lu, Al, Ga, In, Si, Ge, Sn, Ti, Zr, Hf, and combinations thereof; wherein the additional cation dopant is not otherwise present in the host material of the scintillator.

8. The scintillator as recited in claim 7, wherein the additional cation dopant is incorporated into the host material in an amount of about 20 at. % or less relative to a cation of the host material for which it is substituting.

9. The scintillator as recited in claim 1, wherein the host material further comprises at least one additional anion dopant selected from the group consisting of: $F^-$, $Cl^-$, $Br^-$, $I^-$, $O^{2-}$, $S^{2-}$, $Se^{2-}$, $Te^{2-}$, and combination thereof; wherein the additional anion dopant is not otherwise present in the host material of the scintillator.

10. The scintillator as recited in claim 9, wherein the additional anion dopant is incorporated into the host material in an amount of about 20 at. % or less relative to an anion of the host material for which it is substituting.

11. The scintillator as recited in claim 1, wherein the host material further comprises an additional component configured to capture thermal neutrons, wherein the additional component is not otherwise present in the host material of the scintillator.

12. The scintillator as recited in claim 11, wherein the additional component is $^6Li$.

13. The scintillator as recited in claim 1, wherein the host material has any of the following formulas: $Cs_2HfCl_6$, $Na_2HfCl_6$, $Li_2HfCl_6$, $Cs_2HfBr_6$, $Na_2HfBr_6$, $Li_2HfBr_6$, $Cs_2HfI_6$, $Na_2HfI_6$, $Li_2HfI_6$, $Cs_2ZrCl_6$, $Na_2ZrCl_6$, $Li_2ZrCl_6$, $Cs_2ZrBr_6$, $Na_2ZrBr_6$, $Li_2ZrBr_6$, $Cs_2HfI_6$, $Na_2HfCl_6$, $Li_2HfI_6$, $Cs_2ZrCl_6$, $Na_2ZrCl_6$, $Li_2ZrCl_6$, $Cs_2ZrBr_6$, $Na_2ZrBr_6$, $Li_2ZrBr_6$, $Cs_2ZrI_6$, $Na_2ZrI_6$, $Li_2ZrI_6$, $Cs_2TiCl_6$, $Na_2TiCl_6$, $Li_2TiCl_6$, $Cs_2TiBr_6$, $Na_2TiBr_6$, $Li_2TiBr_6$, $Cs_2TiI_6$, $Na_2TiI_6$, or $Li_2TiI_6$.

14. The scintillator as recited in claim 1, wherein a length of at least one dimension of the scintillator is in a range from about 1 mm to about 12 inches.

15. The scintillator as recited in claim 1, wherein the scintillator is an optically transparent single crystal.

16. The scintillator as recited in claim 1, wherein the scintillator has physical characteristics of being formed via melt growth.

17. A radiation detection system, comprising:
the scintillator as recited in claim 1; and
a processing device configured to process pulse traces corresponding to light pulses from the scintillator.

18. The scintillator as recited in claim 1, wherein the scintillator is an optically transparent pressed powder or sintered polycrystalline body.

19. A radiography system, comprising:
the scintillator as recited in claim 18; and
a photodetector array configured to detect light pulses from the scintillator at different points within the plane of the scintillator,
wherein the scintillator is positioned near the photodetector array so as to substantially direct the light pulses to the photodetector array.

20. A scintillator, comprising:
a host material having the chemical formula: $A_2BX_6$, wherein A includes a monovalent ion, B includes a tetravalent ion, and X includes a halide ion,
wherein the host material further comprises at least one additional cation dopant, at least one additional anion dopant, or at least one additional cation dopant and at least one additional anion dopant;

wherein the at least one additional cation dopant, when present, is selected from the group consisting of: Li, Na, K, Rb, Cs, Mg, Zn, Ca, Sr, Ba; La, Gd, Lu, Al, Ga, In, Si, Ge, Sn, Ti, Zr, Hf, and combinations thereof, wherein the additional cation dopant is not otherwise present in the host material of the scintillator;

wherein the at least one additional anion dopant, when present, is selected from the group consisting of: $F^-$, $Cl^-$, $Br^-$, $I^-$, $O^{2-}$, $S^{2-}$, $Se^{2-}$, $Te^{2-}$, and combination thereof, wherein the additional anion dopant is not otherwise present in the host material of the scintillator.

21. A scintillator, comprising:

a host material having the chemical formula: $A_2BX_6$, wherein A includes a monovalent ion, B includes a tetravalent ion, and X includes a halide ion, wherein the host material further comprises at least one activator ion selected from the group consisting of: $Tl^+$, $Cu^+$, $Ag^+$, $Au^+$, $Pb^{2+}$, $Bi^{3+}$, $In^+$, $Sn^{2+}$, $Sb^{3+}$, $Ce^{3+}$, $Pr^{3+}$, $Eu^{2+}$, $Yb^{2+}$, $Nb^{5+}$, $Ta^{5+}$, $W^{6+}$, and combinations thereof.

* * * * *